R. KELLY & E. F. SIBERT.
ENSILAGE MACHINE.
APPLICATION FILED APR. 4, 1913.
1,108,373.
Patented Aug. 25, 1914.
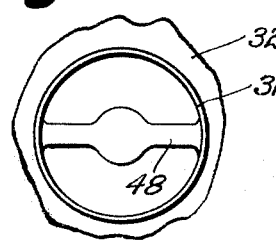
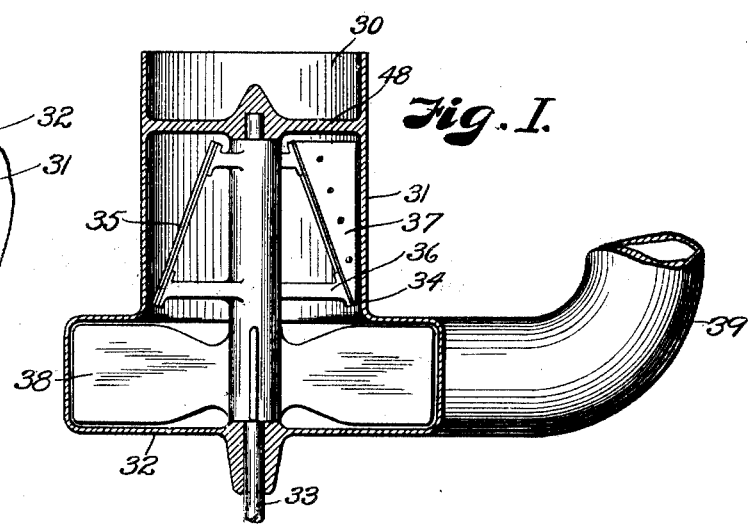
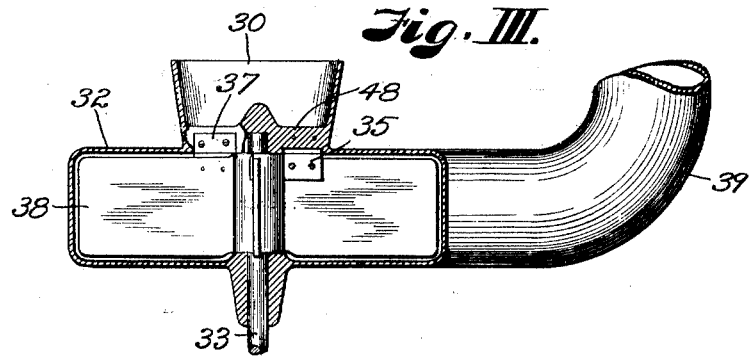
WITNESSES:
Arthur W. Caps
Leta E. Coats.
INVENTORS
Ray Kelly,
E. F. Sibert.
Arthur C. Brown
ATTORNEY

UNITED STATES PATENT OFFICE.

RAY KELLY AND EDWIN F. SIBERT, OF KNOBNOSTER, MISSOURI.

ENSILAGE-MACHINE.

1,108,373.  Specification of Letters Patent.  Patented Aug. 25, 1914.

Application filed April 4, 1913. Serial No. 758,750.

*To all whom it may concern:*

Be it known that we, RAY KELLY and EDWIN F. SIBERT, citizens of the United States, residing at Knobnoster, in the county of Johnson and State of Missouri, have invented certain new and useful Improvements in Ensilage-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to ensilage machines, and more particularly to a machine for chopping fodder and delivering the same to a wagon box, silo or the like; the principal object of the invention being to provide a machine wherein the cutting and delivering elements are closely associated with each other, in order to secure direct action and compact construction.

In accomplishing this object we have provided improved details of structure, the preferred form of which is illustrated in the accompanying drawings, wherein:—

Figure 1 is a side view of a chopper and elevator fan constructed in accordance with our invention, the case being in vertical section. Fig. 2 is a plan view of the chopper hopper. Fig. 3 is an elevation of a modified form of chopper wherein the chopping knives are mounted on the elevator fan.

Referring more in detail to the parts:— 30 designates the hopper of the machine, which is rigidly secured to and which opens into the top of a casing 31. Revolubly mounted in the casing 31 and in a fan casing 32 which is preferably formed integral with the chopper casing, is a shaft 33, and fixed on said shaft within the casing 31 is a knife 34, preferably comprising spiral blades 35 (Fig. 1), which are attached to cross bars 36 radiating from the shaft, and a cutter bar 37 which is fixed to the interior of the case just in advance of the hopper mouth. The chopper casing opens directly into the fan casing 32, and fixed on the shaft 33, within the casing 32, is a fan blower 38 of the ordinary type, which is adapted for blowing chopped feed from the casing 32 through a conduit 39, which may extend to any desired point. The shaft 33 extends beyond the casing 32 and is provided with suitable bearing (not shown) for driving the fan and chopper.

In Figs. 1 and 2 we show a form of chopper knife and arrangement of the blower wherein the knife forms a cone rather than a spiral and wherein the fan blower is arranged horizontally so that the conduit is provided with an upturned elbow, and in Fig. 3 we show a modification which, like the device shown in Fig. 1, is adapted for vertical feed, and within which the chopper blades are carried on the fan blades and adapted for coöperation with the cutter bars on the web 48 which extends across the hopper and directs the stalks into the cutter. In using the device the stalks are fed into the hopper and pass into the blades 34 where they are reduced to a comminuted mass that falls into the fan chamber and is conducted to the desired point. In the fan shown in Fig. 3, the capacity of the chopper is increased, as stalks may be fed to almost the entire hopper area, and a plurality of stationary knives are mounted within the casing which increase the efficiency of the chopper without decreasing the feeding capacity of the hopper. The form shown in Fig. 3 is very compact, and also provides a large cutter capacity compared with the feed area.

Having thus described our invention, what we claim as new therein, and desire to secure by Letters Patent, is:—

1. An ensilage cutter comprising a casing having communicating knife and fan chambers, the former provided with a hopper mouth, a shaft journaled in said casing, a knife fixed on the part of said shaft within the knife chamber, a fan fixed on said shaft within the fan chamber, means for delivering stalks endwise through the hopper mouth and longitudinal with the shaft, a conduit opening from the fan chamber, and common means for actuating the knife and fan.

2. An ensilage cutter comprising a cylindrical casing, a hopper opening into one end of said casing, a shaft revolubly mounted in said casing and concentric with said hopper, stationary knives in said chamber, a knife on said shaft adapted for coöperation with said stationary knife, a fan chamber opening into said cylindrical chamber, a fan rigidly mounted on said shaft within said fan chamber, a conduit opening from said fan chamber, and means for revolving said shaft.

3. An ensilage cutter comprising an upright cylindrical casing, a hopper opening into the upper end of said casing, a bearing supported in the mouth of said hopper and concentric with said cylindrical casing, a fan casing opening from the lower end of said cylindrical casing, a bearing in said fan casing concentric with said cylindrical casing, a shaft revolubly mounted in said bearings, a knife rigidly mounted in said cylindrical casing, a plurality of knives on said shaft adapted for coöperation with said stationary knife, a fan rigidly mounted on said shaft within said fan casing, and means for revolving said shaft.

4. An ensilage cutter comprising an upright cylindrical casing, a hopper opening into the top of said casing, a fan casing opening from the bottom of said casing, a bearing supported across the mouth of said hopper and concentric with said cylindrical casing, a stationary knife in said cylindrical casing inclined upwardly and inwardly toward said bearing, a shaft revolubly mounted in said bearing and in said fan casing, a plurality of inclined knives on said shaft for coöperating with said stationary inclined knife, a fan rigidly mounted on said shaft with said fan casing, and means for revolving said shaft.

5. An ensilage cutter comprising a fan casing, a hopper opening into said fan casing, a bearing supported across the mouth of said hopper and concentric therewith, a plurality of stationary knives on said bearing, a shaft revolubly mounted in said bearing and in said fan casing, a fan in said fan casing rigidly mounted on said shaft, a knife on each of said fan blades adapted for coöperation with said stationary knives, and means for revolving said shaft.

In testimony whereof we affix our signatures in presence of two witnesses.

Dr. RAY KELLY.
EDWIN F. SIBERT.

Witnesses:
ARTHUR W. CAPS,
LETA E. COATS.

Copies of this patent may be obtained for five cents each, by addressing the "Commissioner of Patents, Washington, D. C."